(12) United States Patent
Gerets et al.

(10) Patent No.: US 7,437,034 B2
(45) Date of Patent: Oct. 14, 2008

(54) DEVICE FOR COUPLING THE LIGHT OF MULTIPLE LIGHT SOURCES

(75) Inventors: Peter Gerets, Roeselare (BE); Chris Colpaert, Lovendegem (BE)

(73) Assignee: Barco, Naamloze Vennootschap, Kortrijk (BE)

( * ) Notice: Subject to any disclaimer, the term of this patent is extended or adjusted under 35 U.S.C. 154(b) by 0 days.

(21) Appl. No.: 11/487,353

(22) Filed: Jul. 17, 2006

(65) Prior Publication Data

US 2007/0014124 A1    Jan. 18, 2007

(30) Foreign Application Priority Data

Jul. 18, 2005 (EP) .................................. 05076646

(51) Int. Cl.
  *G02B 6/34* (2006.01)
  *G02B 27/10* (2006.01)
  *G03B 21/26* (2006.01)

(52) U.S. Cl. ............................ 385/36; 385/89; 359/636; 359/639; 359/640; 353/94; 362/234

(58) Field of Classification Search ................ 362/234; 353/94; 359/636, 639–640; 385/36, 89
See application file for complete search history.

(56) References Cited

U.S. PATENT DOCUMENTS 6,222,674 B1    4/2001 Ohta
6,341,876 B1    1/2002 Moss et al.
6,765,727 B1 *  7/2004 Chang .......................... 359/630
6,843,591 B1    1/2005 Peng et al.
7,182,468 B1 *  2/2007 Haven .......................... 353/94
2001/0048562 A1  12/2001 Bartlett et al.
2002/0008972 A1  1/2002 Dewald

FOREIGN PATENT DOCUMENTS

EP      0 978 748       2/2000
WO      WO 2005/012979  2/2005

* cited by examiner

*Primary Examiner*—M. R. Connelly-Cushwa
*Assistant Examiner*—Jerry T Rahll
(74) *Attorney, Agent, or Firm*—Bacon & Thomas, PLLC

(57) ABSTRACT

A device for coupling the light of multiple light sources (2, 3) that substantially consists of a reflectance surface (10, 11) for one or more of said light sources (2, 3) and at least one integration rod (14) having an incident surface (15), whereby the reflectance surfaces (10, 11) are positioned in light bundles (12) emitted by the light sources (2, 3) between said light sources (2, 3) and said integration rod (14); whereby the spot of each light source (2, 3) at its focal point has a surface that is smaller than the surface of said incident surface (15); and whereby said light bundles (12) enter the integration rod (14) at different parts of its incident surface (15).

13 Claims, 4 Drawing Sheets

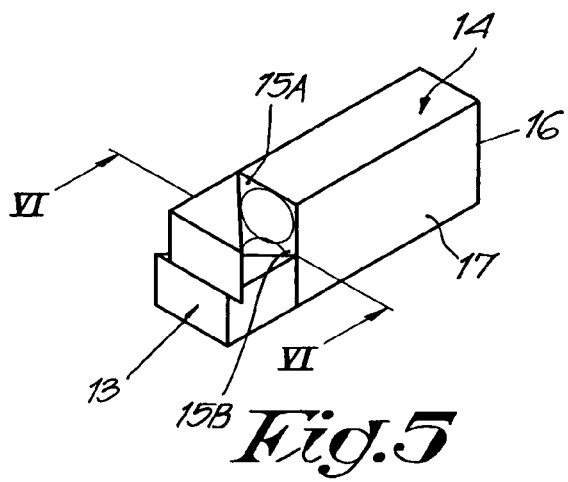
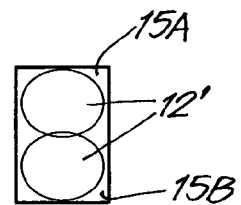
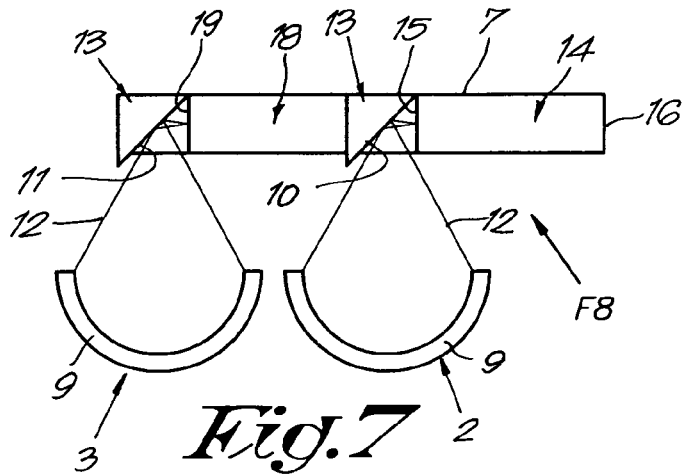

DEVICE FOR COUPLING THE LIGHT OF MULTIPLE LIGHT SOURCES

BACKGROUND OF THE INVENTION

1. Field of the Invention

The present invention concerns a device for coupling the light of multiple light sources, more specifically to create a uniform light bundle with two or more separate light sources.

2. Discussion of the Related Art

Such devices are known in the fields of lighting and image and movie projections, whereby a light bundle has to be directed on a reflective or transmissive light valve such as a digital micro-mirror device (DMD) or a liquid crystal (LC) panel.

Light valves and in particular reflective light valves such as digital micro-mirror devices require a relative strict control of the incoming light bundle.

Indeed, the different mirrors of a micro-mirror device can only switch over a certain angle between a position wherein light is projected on stage and a position wherein light is projected off stage, whereby said angle is usually comprised between 20° to 24°, i.e. 10° to 12° in each direction.

Said certain angle limits the angle over which the light valve may be illuminated, since an angle of incoming light that is larger than 20° or 24° leads to light shining under the micro-mirrors of the light valve, resulting in an unallowable heating of the light valve.

In case use is made of one single light source, the angle of the emitted light bundle can be corrected by means of a reflector cap behind the light source and by means of an array of lenses positioned in between the light source and the light valve.

In case multiple light sources are provided, the light of said light sources should be coupled in order to create a uniform light beam that is directed to the light valve.

It is known to couple the light of two or more light sources by means of a light pipe that typically consists of a quartz rectangular sectioned integration rod. Hereto the light bundles of the different light sources are focused on an incident surface at one end of the rod. Since the light bundles are than kept in the rod by total internal reflection on the longitudinal side walls of said rod, a uniform light bundle is created leaving the integration rod at its transversal wall opposite to the incident surface.

In order to focus the light bundle of the different light sources on the incident surface of the integration rod different options are known.

A first option is to provide two light sources, two reflector surfaces and a condenser lens. The light emitted by a first of said light sources reflected by a first of said reflector surfaces towards the condenser lens. Likewise, the light emitted by the second light source is reflected by said second reflector lens towards the condenser lens. The condenser lens finally focuses the incoming light on the incident surface of the integration rod.

An inconvenience of this option is that it appears to be very difficult, if not impossible, to perfectly focus the light of the light sources on the incident surface of the integration rod. A consequence of an imperfect focus is that the light bundle leaving the integration rod has a relatively broad angle that should be narrowed again before illuminating the light valve in order to avoid excessive heat production.

The inconvenience of the above mentioned embodiment can be solved by providing an elliptic housing, so that the emitted light bundle is convergent and that, as such, the emitted light can be focused on the incident surface without the need for a condenser lens.

This embodiment has the inconvenience that the incident surface of the integration rod may not be much larger than the spot at the focal point of one of said light sources, since otherwise the efficiency of said rod is rather low.

In order to further increase the efficiency, one might use a conical integration rod, though a decrease of the area of the incident surface of the rod reduces the light coupling capacity of said rod.

Another option is to provide two light sources that are directed directly to the rod.

An inconvenience of this option is that the angles of the different light bundles entering the rod all differ, resulting in a light bundle with a wide angle leaving the rod.

Yet another option consists of providing two additional integration rods positioned one next to the other, with one end against the incident surface of the integration rod. The light sources are in this case focused on a longitudinal incident surface at the free end of said additional rods.

The wall opposite to said incident surface of both additional rods is bevelled and provided with an internal mirror, such that light entering the additional rods is reflected under a desired angle by said mirror.

The light bundles of both separate additional rods will finally be coupled in the integration rod, so that a uniform light bundle leaves the integration rod with an appropriate angle.

A major inconvenience of this last embodiment is that the mirrors tend to heat due to the incoming light. The cooling of this mirror that is positioned next to the rod however is nearly impossible due to the poor heat transport in the rod.

Another important inconvenience is that the additional rods have to be physically separated by a layer of air, since any contact between both additional rods disturbs the internal reflection in said rods.

Said physical separation of both additional rods is very difficult to realise since the dimensions of the cross section of an integration rod to be used with a conventional DMD are about 4×6 mm. This implies that the cross sectional dimensions of the additional rods have to be smaller than 2×3 mm, while the length of the additional rods may be several centimetres.

SUMMARY OF THE INVENTION

The goal of the present invention is to provide a solution for one or more of the above-mentioned and other inconveniences.

Hereto the present invention concerns a device for coupling the light of multiple light sources that substantially consists of a reflectance surface for one or more of said light sources and at least one integration rod having an incident surface, whereby each light source is enabled to emit a light bundle either on the corresponding reflectance surface that focuses the light on said incident surface or directly on said incident surface; whereby the reflectance surfaces are positioned in the light bundles emitted by the light sources between said light sources and said integration rod and possibly an optional rod; and whereby the spot of each light source at its focal point has a surface that is smaller than the surface of the incident surface of the integration rod, and whereby the light bundles of the different light sources enter the integration rod at different, though possibly overlapping, parts of its incident surface.

An advantage of the present invention is that the light bundles of the different light sources all enter the integration rod at an equal angle. This equality of the incoming angle results in the creation of a coupled light bundle leaving the integration rod at an appropriate angle.

Another advantage is that the spot in the focal points of the different light sources all enter the integration rod at different parts of its incident surface. As a consequence the number of light sources can be chosen as a function of the incident surface of the integration rod. The integration rod must not be adapted to the spot of the focal point of the different light sources and can be chosen in function of its effectiveness to couple light beams.

Moreover the use of multiple light sources allows enhancing the brightness of a projected image.

Yet another advantage of the present invention is that the reflectance surfaces are not positioned against a rod and can easily be cooled.

According to another embodiment the device substantially consists of at least one integration rod having an incident surface, and of two or more additional rods each having an incident surface whereby each light source is enabled to emit a light bundle on the incident surface of the corresponding additional rod, whereby the additional rods are positioned with a surface against the incident surface of the integration rod; whereby the spot of each light source at its focal point has a surface that is smaller than the surface of the incident surface of the integration rod; whereby the focal point of the light sources coincides with the incident surface of the corresponding additional rod; and whereby the light bundles (12) of the different light sources (2, 3) enter the integration rod (14) at different, though possibly overlapping, parts of its incident surface (15).

BRIEF DESCRIPTION OF THE DRAWINGS

In order to better explain the characteristics of the present invention, the following embodiments of a device according to the invention for coupling the light of multiple light sources are described as an example only without being limitative in any way, with reference to the accompanying drawings, wherein:

FIG. 5 represents a view according to arrow F5 in FIG. 4;

FIG. 6 represents a cross section according to line VI-VI in FIG. 5;

FIGS. 9 to 15 three two variants of the FIGS. 4 to 6.

DESCRIPTION OF THE PREFERED EMBODIMENT

Figure 1:
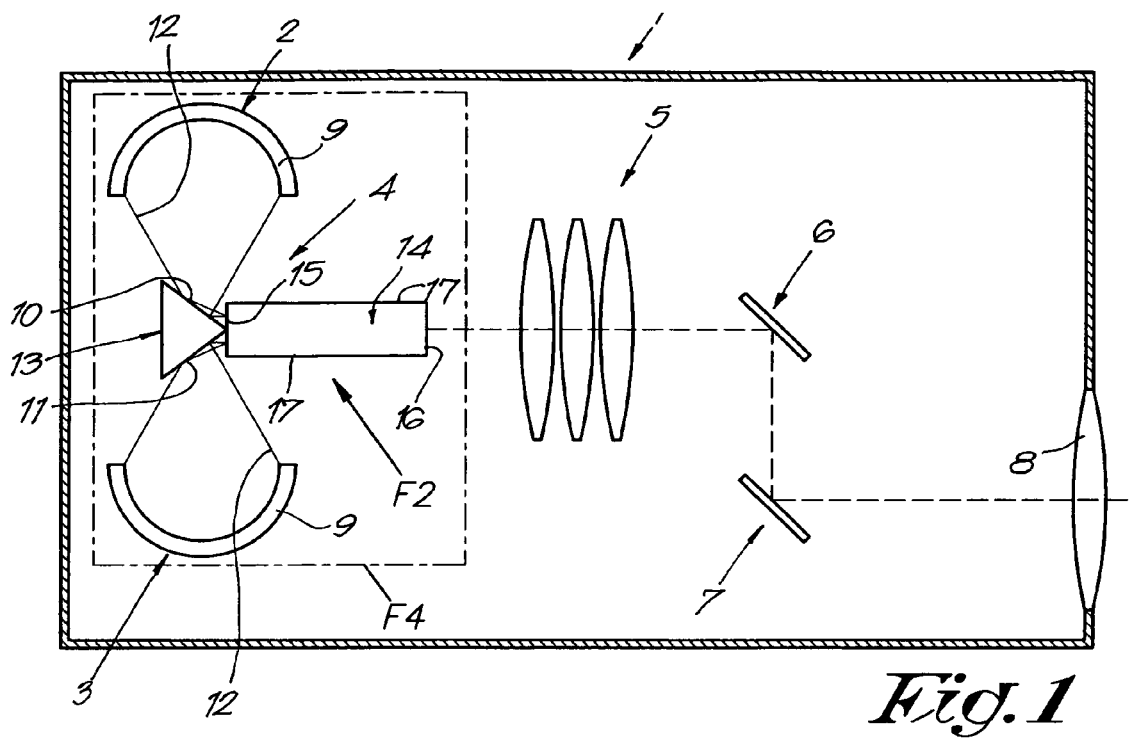
FIG. 1 schematically represents a projector provided with a device according to the invention.

FIG. 1 represents a projector 1 consisting of two light sources 2 and 3, a device 4 for coupling the light of said light sources 2 and 3, an array of lenses 5, a mirror 6, a digital light valve 7 and a projection lens 8.

In this case the light sources 2 and 3 preferably are so-called short arc lamps that are characterised with a short focal distance.

Said light sources 2 and 3 are provided with a reflectance cap 9 such that both light sources emit light in a direction towards one another.

Figure 2:
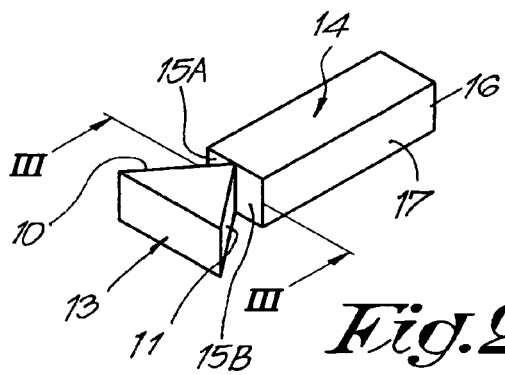
FIG. 2 represents at a larger scale a view according to arrow F2 in FIG. 1.

For each light source 2 and 3 a reflector surface 10, 11 respectively, is provided in the light bundle 12 emitted by each of said light sources 2 and 3. As represented in FIG. 2, said reflector surfaces 10 and 11 are formed by two adjacent sides of a triangular body 13 that is provided in the light bundles 12 between the light sources 2, 3 respectively, and an integration rod 14.

It is hereby remarked that the triangular body 13 and the integration rod 14 are separate parts of the device 4 according to the invention and that the reflector surfaces 10, 11 are not integrated in the integration rod 14.

The above mentioned integration rod 14 preferably consists of a quartz rectangular sectioned rod with an incident surface 15 that is positioned towards the triangular body 13, with a front wall 16 opposite to the incident surface 15 and with longitudinal side walls 17.

It is remarked that the connection line between the adjacent reflectance surfaces 10 and 11 of the triangular body 13 is preferably positioned in the proximity of or the centre of the incident surface 15 of the integration rod 14.

The light valve 7 represented in FIG. 1 is a reflective light valve such as a digital micro-mirror device. Clearly, the present invention also allows the use of other types of light valves 7, such as liquid crystal (LC) panels or liquid crystal on silica panels also known as LCOS-panels.

The functioning of the projector and the device 4 according to the invention is relatively easy and as follows.

The light bundle 12 emitted by the light source 2 is reflected by said reflectance surface 10 towards a part, in particular towards one half 15A of the incident surface 15. The focal point of said light bundle 12 hereby coincides with the incident surface 15. Likewise the light bundle 12 emitted by the light source 3 is reflected by said reflectance surface 11 towards another half 15B of the incident surface 15.

Figure 3:
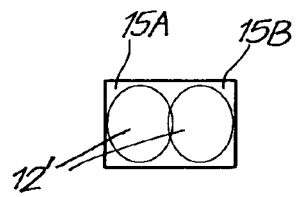
FIG. 3 represents a cross section according to line III-III in FIG. 2 during use of the device.

As represented in FIG. 3, the spot 12' at the focal point of the light bundles 12 preferably fits in the corresponding half of the incident surface 15. This fitting results in that light enters over nearly the entire incident surface 15 into the integration rod 14.

Moreover the angle at which the light bundles 12 enter the integration rod 14 will be equal when the relative position of the light sources 2 and 3 and the reflectance surfaces 10 and 11 in view of the rod 14 is set to be equal.

Once the light bundles 12 enter the integration rod 14 they are reflected in a zigzag pattern between the longitudinal side walls 17 of the integration rod 14, before leaving said rod 14 through the front wall 16 as a uniform light bundle.

The uniform light bundle is subsequently magnified by the array of lenses 5, before being projected to the light valve 7 via the mirror 6.

The light valve 7 finally processes the light bundle and projects an image through the projector lens 8 on a screen or stage.

Figure 4:
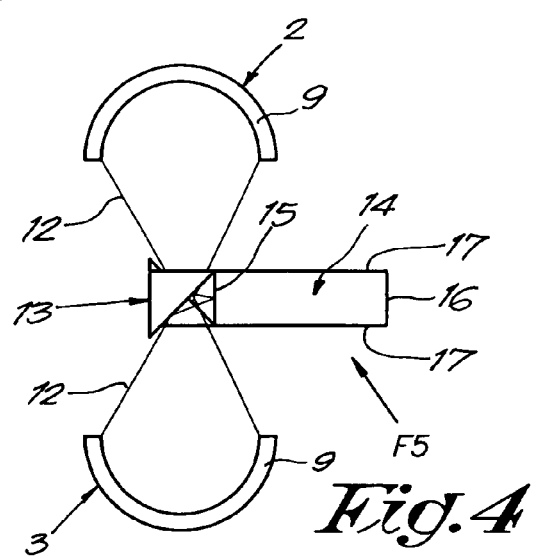
FIG. 4 represents a variant of the part indicated by F4 in FIG. 1.

When presuming that in the above described embodiment the incident surface 15 is divided in a left and a right part, the embodiment shown in FIGS. 4 to 6 represents a variant wherein the incident surface 15 is divided in an upper part 15A and a lower part 15B.

In this variant the reflectance surfaces 10 and 11 are formed by the basis of two triangular bodies 13 positioned, with their reflectance surfaces 10, 11 crosswise one above the other.

It is clear that in this case both light sources 2 and 3 should be positioned at a different level, so that their light bundles 12 are directed perfectly towards the corresponding reflectance surface 10 and 11 respectively.

As represented in FIG. 6, the spots 12' at the focal points of the light sources 2, 3 are positioned one above the other on the incident surface 15 of the integration rod 14.

FIGS. 7 to 9 represent another variant, wherein the light sources 2 and 3 are positioned next to one another at one side of the integration rod 14.

In this case an additional rod 18 is provided against the incident surface 15 of the integration rod 14. Said additional rod 18 in this case having a cross sectional dimension that covers half of the incident surface 15.

The first reflectance surface 10 of this embodiment is provided in front of the uncovered half 15A of the incident surface 15, while the second reflectance surface 11 is provided in front of an incident surface 19 of the additional rod 18.

The position of the first light source 2 in this embodiment is the same as the position of this light source 2 in the embodiment represented in FIG. 4.

The position of the second light source 3 is such that it emits light on the second reflectance surface 11, whereby the focal point of this second light source 3 coincides with the incident surface 19 of the additional rod 18.

It is clear that the angle of the light bundle 12 of the first light source 2 entering the integration rod 14 is preferably equal to the angle at which the light bundle 12 of the second light source 3 enters the additional rod 18.

The functioning of this variant differs from that of the previously described embodiments in that the light bundle of the second light source 3 does not immediately enter the integration rod 14.

Indeed, said light bundle 12 first travels through the additional rod 18, wherein it is kept by total internal reflection, before leaving it through a front wall 20 positioned against the lower part of the incident surface 15 of the integration rod 14.

It is remarked that in this embodiment the second reflectance surface 11 may not be integrated in the additional rod 18 and may not be positioned against and parallel to a wall of said rod 18.

The only correct position of the second reflectance surface 11 is in the light bundle 12 emitted by the second light source 3, between said light source 3 and the additional rod 18.

Figure 10:
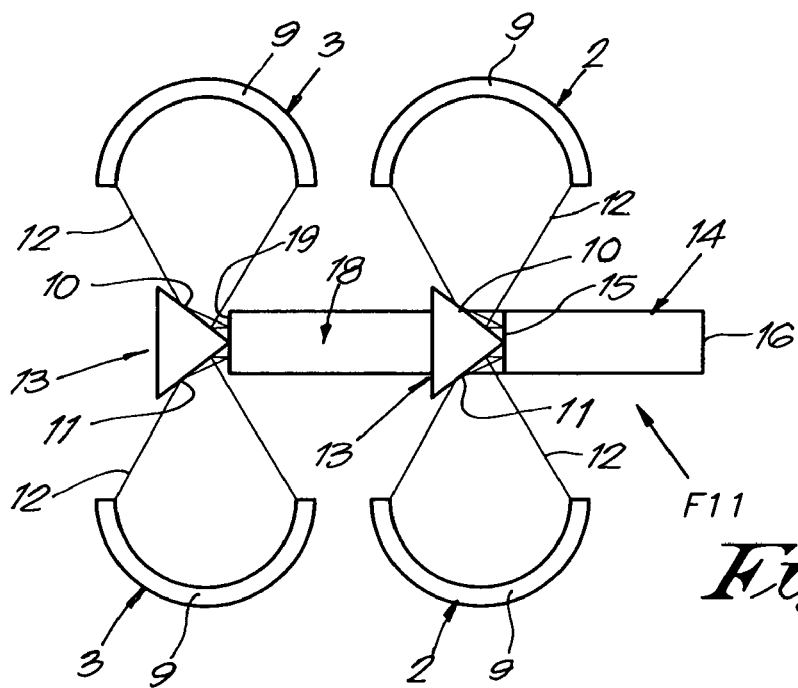
Figure 11:
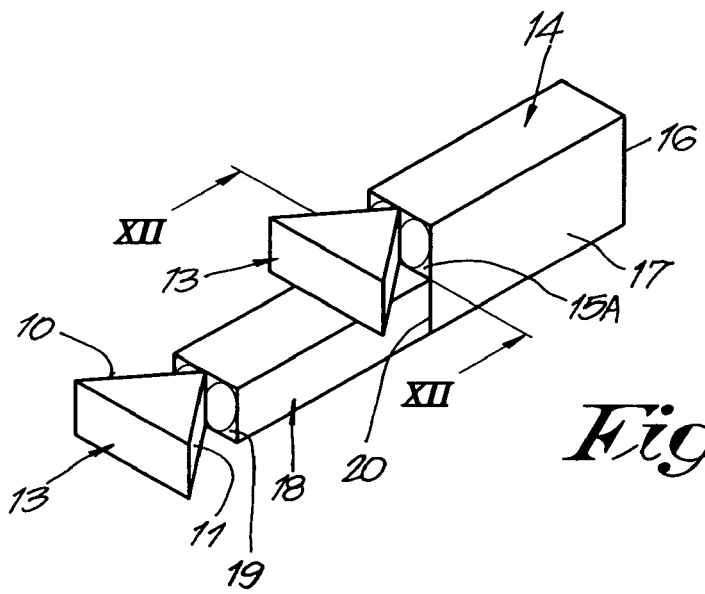
Figure 12:
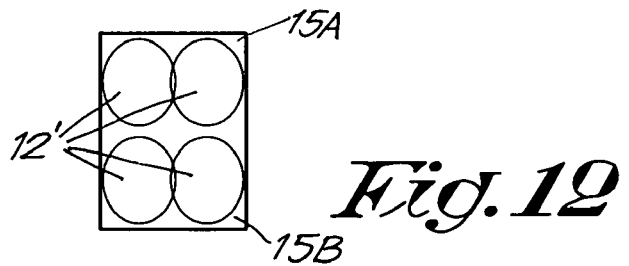

FIGS. 10 to 12 represent another variant wherein the light of four distinct light sources 2-3 is coupled.

The reflectance surfaces 10 and 11 of two of these light sources are positioned next to the upper part 15A of the incident surface 15 of the integration rod 14. The reflectance surfaces 10 and 11 are formed by two adjacent sides of a triangular body 13, whereby the connection line of both sides is arranged at the centre of said upper part 15A of the incident surface 15. As such the upper part 15A of the incident surface is divided in two subparts positioned next to one another.

Likewise the incident surface 19 of the additional rod 18 is divided in two subparts by a second triangular body 13 comprising two reflectance surfaces 10 and 11.

It is clear that in this embodiment the light sources 2 and 3 should be selected on the basis of their focal distance and the length of their light arc. Indeed, the spot at the focal points of these light sources 2-3 should be about a quarter of the surface of the incident surface 15 of the integration rod 14, as represented in FIG. 12.

Although the spot at the focal points of the different light sources may partially overlap at the incident surface 15, the different light bundles still should enter the integration rod 14 at identical angles.

The functioning of this variant differs from the previously described embodiments in that the light of two of the light sources is coupled in the additional rod 18, prior to be coupled to the light of third and fourth light sources that immediately enters the integration rod 14.

Figure 13:
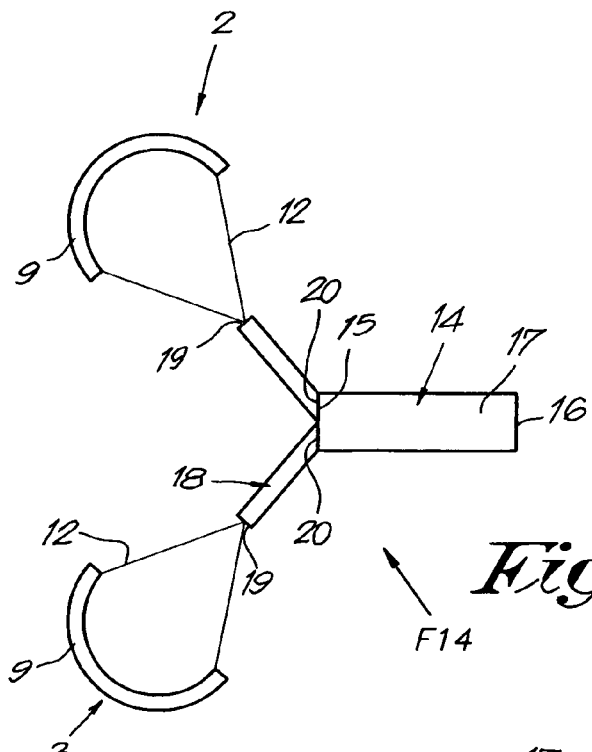
Figure 14:
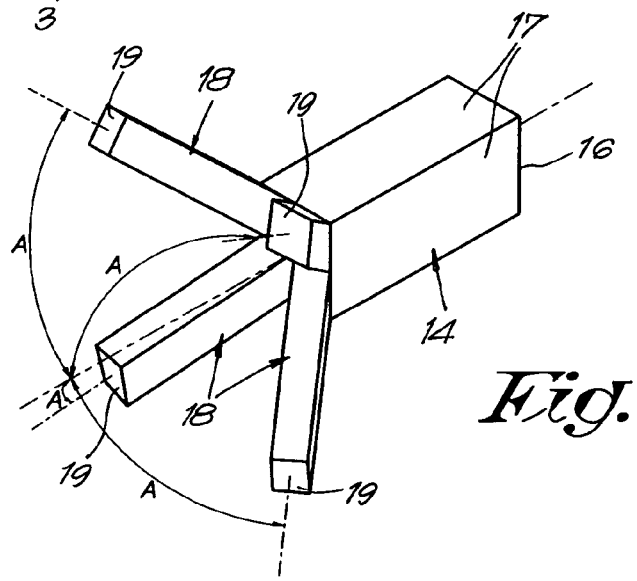
Figure 15:
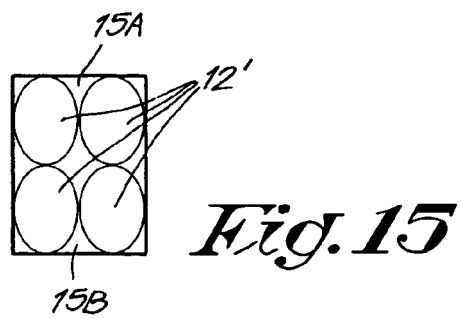

Yet another variant is represented in the final FIGS. 13 to 15. In this variant, four light sources 2, 3 are directly focused on an incident surface 19 of four different additional rods 18.

Each of said additional rods 18 has a front wall 20 that is positioned against the incident surface 15 of the integration rod 14.

In this case, the front walls 20 of the different additional rods 18 are placed adjacent to one another, while the surface of each of said front walls 20 equals a quarter of the incident surface 15 of the integration rod 14.

As clearly represented in FIG. 14, the incident surfaces 19 of the additional rods 18 are spaced apart, such that the side walls of the different additional rods 18 do not enter into contact with each other in order not to disturb the total internal reflection of light in said rods 18.

It is noticed that the angle A defined between the longitudinal direction of each of the additional rods 18 and the direction perpendicular on the incident surface 15 of the integration rod 14 preferably has the same absolute value for every additional rod 18.

The functioning of this variant is basically the same as the functioning of the previously described variants. The only difference is that the light of the light sources is focused directly on the incident surfaces 19 of the different additional rods 18.

It is remarked that the present invention is not limited to the coupling of the light of maximally four light sources. Similar embodiments arranged with two or more additional light rods may be designed on the basis of the above description for five, six or even more light sources.

Finally it is noticed that the device according to the invention is not limited for use in projectors. It may also be applied in lighting devices such as so called gobos or in other light emitting applications.

The present invention is by no means limited to the above described embodiments given as an example only and represented in the accompanying drawings; on the contrary, such a device according to the invention for coupling the light of different light sources can be realised in all sorts of variants while still remaining within the scope of the present invention.

The invention claimed is:

1. A device for coupling the light of multiple light sources, comprising a reflectance surface associated with one or more of said light sources and at least one integration rod having an incident surface, so that each light source is enabled to emit a light bundle either on the corresponding reflectance surface that focuses the light on said incident surface or directly on said incident surface; wherein the reflectance surfaces are positioned in the light bundles emitted by the light sources between said light sources and said at least one integration rod; and wherein the spot of each light source at its focal point has a surface that is smaller than the surface of the incident surface of the at least one integration rod; and further wherein the light bundles of the different light sources enter the at least one integration rod at different and optionally overlapping, parts of its incident surface;

wherein an additional integration rod is provided that is positioned with one end against the incident surface of the at least one integration rod, and wherein the cross section of the additional integration rod is smaller than the cross section of the incident surface;

wherein a reflectance surface is provided that focuses the light of one or more first light sources on the uncovered part of the incident surface of the at least one integration rod, and wherein a second reflectance surface is provided that focuses the light of one or more second light sources on an incident surface of the additional integration rod;

wherein the reflectance surface is formed by two adjacent sides of a triangular body, a connection line between said sides is positioned against or in the proximity of the center of the uncovered part of the incident surface of the at least one integration rod such that the uncovered part is divided into two subparts positioned next to one another; and wherein the second reflectance surface is formed by two adjacent sides of a triangular body, a connection line between said sides being positioned against to or in the proximity of the center of the incident surface of the additional integration rod such that the incident surface is divided into two subparts.

2. The device according to claim 1, wherein a reflectance surface is provided for each light source.

3. The device according to claim 1, including two light sources, and wherein the spot at the focal point of each of said light sources has a surface that is about equal to half the surface of the incident surface of the at least one integration rod.

4. The device according to claim 1, wherein the light sources are positioned at both sides of the at least one integration rod.

5. The device according to claim 4, wherein the reflectance surfaces are formed by two adjacent sides of a triangular body, and wherein the connection line between said sides is positioned against to or in the proximity of the center of the incident surface.

6. The device according to claim 4, wherein the reflectance surfaces of two different light sources are positioned one above the other.

7. The device according to claim 1, wherein the reflectance surface focuses light of two first light sources onto the respective subparts of the incident surface of the at least one integration rod.

8. The device according to claim 1, wherein the second reflectance surface focuses light of two second light sources onto the respective subparts of the incident surface of the additional integration rod.

9. A device for coupling the light of multiple light sources according to claim 1, wherein said at least one integration rod comprises two or more additional integration rods each having an incident surface, wherein each light source is enabled to emit a light bundle on the incident surface of the a corresponding additional integration rod, and wherein the additional integration rods are positioned with a surface against the incident surface of the at least one integration rod; and the focal point of the light sources coinciding with the incident surface of a corresponding additional integration rod.

10. The device according to claim 9, wherein the side walls of the adjacent additional integration rods are spaced apart.

11. The device according to claim 9, wherein an angle defined between the longitudinal direction of each of the additional integration rods and the direction perpendicular on the incident surface of the at least one integration rod is the same for every additional integration rod.

12. The device according to claim 1, wherein the light reflected from the one or more first light sources and the light reflected from the one or more second light sources all enter the at least one integration rod at identical angles.

13. The device according to claim 1, wherein light of four distinct light sources is coupled in the integration rod.

* * * * *